Patented Oct. 28, 1924.

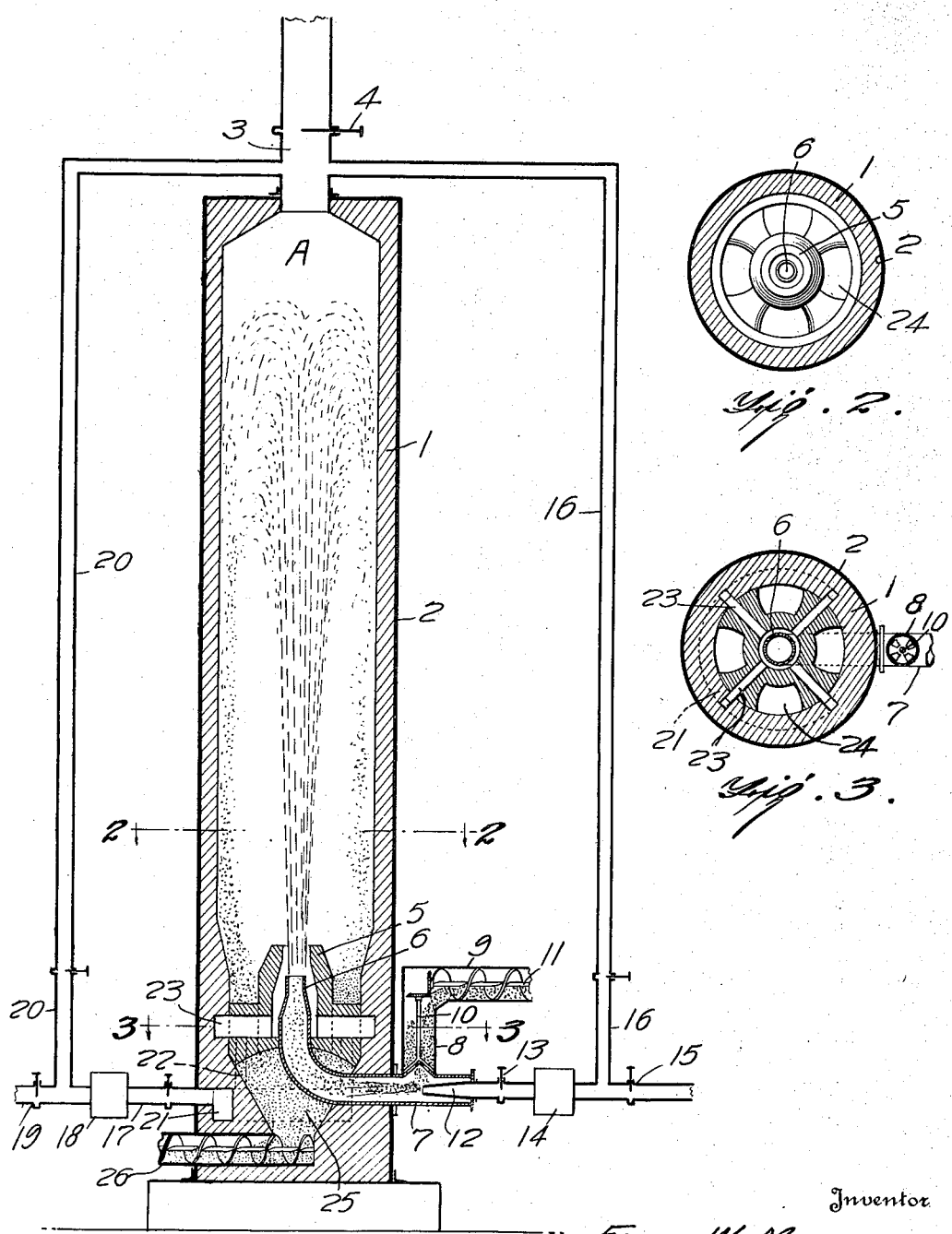

1,513,622

UNITED STATES PATENT OFFICE.

FRED W. MANNING, OF BROOKLYN, NEW YORK, ASSIGNOR TO MANNING REFINING EQUIPMENT CORPORATION, A CORPORATION OF DELAWARE.

APPARATUS FOR REVIVIFYING PURIFYING MATERIALS.

Application filed April 9, 1923. Serial No. 631,002.

*To all whom it may concern:*

Be it known that I, FRED W. MANNING, a citizen of the United States, residing at Brooklyn, in the county of Kings and State of New York, have invented certain new and useful Improvements in Apparatus for Revivifying Purifying Materials, of which the following is a specification.

This invention relates to apparatus for revivifying purifying materals; and it comprises a vertical shaft chamber; stack means for removing the gaseous products therefrom, means for feeding pulverulent material to a point near the base, centered injector means for projecting said material vertically upwards fountainwise within said shaft, means for supplying fuel and air for combustion in proximity to the upwardly projected particles of material, means for supplying stack gases to the same and means for removing treated material falling laterally and accumulating at the base of the shaft chamber; all as more fully hereinafter set forth and as claimed.

In many arts it is the custom to treat liquids with various pulverulent or finely divided purifying materials, as in the case of sugar solutions, oils, etc. The purifying materials in use are of tolerably varied character, including certain hydrated varieties of clay known as fuller's earth; various forms of porous or previous hydrated silica, such as kieselguhr or diatomaceous earth; boneblack or blood char; activated carbons or "decolorizing carbons," etc., etc. All of these materials have the property in common of being quite susceptible to the action of heat. In the case of fuller's earth and kieselguhr the physical properties change with removal of water of hydration and heating to an undue temperature or for an undue length of time is apt to result in lessened activty, while with the various carbon preparations, oxidation of the carbon is to be feared. After these materials have been used for purifying purposes they are charged with various organic matters and these must be removed in order to refit the material for use. Commonly this is done by some method of heating; the function of the heating being to volatilize or carbonize organic matters. It is also desirable to have a limited degree of oxidation at the same time to get rid of secondary carbon formed in charring which may accumulate in and clog the pores. This limited oxidation going only as far as it is desired it should go, however, is extremely difficult to accomplish.

In another and copending application, Serial No. 568,790, I have described and claimed a method of revivifying used pulverulent purifying materials of this class wherein the material is given a short exposure to heat under accurately regulated conditions. In this method the pulverulent material is projected upward as a sort of fountain or jet by means of a body of gases undergoing combustion. When necessary or desirable this combustion is slowed down and regulated by admixing an endothermic (products of combustion or water vapor) with air or gas. This fountain or jet of commingled flaming hot gases and pulverulent material is produced axially of a rather roomy shaft chamber. The projected solid material travels upwardly in contact with the hot gases for a short and regulable period of time and then spreads laterally, falling to, and accumulating in, the bottom of the shaft, whence the accumulation is removed from time to time or continuously as the case may be. By varying the force of the jet, the time of exposure of the material to the heat and for the action of the hot gases upon it can be accurately controlled. The amount of combustion taking place during the time the flaming gases are in contact with the rising material and the development of heat can be controlled and regulated by adjustment of the fuel and of the air. Ordinarily I use air under pressure and either gas or sprayed oil coming from carburetting means or the like. Naturally, the ratio of fuel to air can be varied within wide limits. As another means of control, affording a number of advantageous possibilities in varying the rate of combustion and the development of heat as well as other conditions, I customarily supply more or less of hot stack gases either to the air or to the fuel or to both. These stack gases can come from the operation itself or from another source. By the use of hot products of combustion, the combustion can be slowed down and the temperature of the flaming gases regulated within quite narrow limits; the slowing down being partly the result of sheer dilution and partly because of endothermic action of $CO_2$ (and $H_2O$). The use of air diluted with products of combustion in this relation has many advantages. The heat of the products of combustion used is also utilized. The action of air in combustion of gas is, of course, to evolve heat; and the air will also oxidize organic matters coming from the materials; also with the development of heat. On the other hand, the products of combustion while capable of oxidizing organic matters do so endothermically with an absorption of heat. The two effects may be made to balance each other to a desired extent in controlling the temperature of the flaming gases. The oxidizing action afforded by the products of combustion is also considerably milder than that by free oxygen; and, as I have found, tends to be exerted on the more reactive organic impurities, and their distillation products, rather than on the fixed carbon of such purifying agents, as boneblack and activated carbon. In making boneblack and activated carbon the more reactive forms of carbon present are done away with in the process itself.

The present application relates to an organization of apparatus elements capable of use in the performance of the described process.

In the accompanying illustration, Fig. 1 is a diagrammatic view, mainly in central vertical section, of a complete apparatus for the present purposes, while Fig. 2 is a view looking downward along line 2—2 of Fig. 1 and Fig. 3 is a horizontal section along line 3—3. In the showing of Fig. 1, the shaft chamber A is lined with any suitable refractory material 1, such as brick or a plastic basic or acid refractory material and is provided with casing 2 of iron or steel or other suitable material. Usually I make it of circular section as shown in Figs. 2 and 3, although other contours may be employed. At the top is provided with a stack 3 dampered at 4; the cross section of this stack being usually rather small as compared with that of the shaft chamber. At a point somewhat above the base the shaft is provided with projecting nozzle 5 axially located. Within this nozzle is injector nozzle 6 spaced somewhat away from the projecting nozzle in a well understood way. This nozzle 6 is continued as conduit 7 passing out the side of the shaft chamber and provided with feeding means for introducing pulverulent material to be treated. As shown, these means comprise a hopper 8 supplied by conveyor casing 9. At the bottom the hopper is provided with an outlet allowing a regulated discharge of pulverulent material; the discharge being controlled by rotating member 10 shown as geared to the shaft 11 of the conveyor. Entering conduit 7, at a point immediately below the point of inlet for solid materials, is another nozzle 12, provided with valve 13 and located on the pressure or discharge side of fan or pump 14. On the suction side of 14 are valved means 15 for admitting air. Another valved pipe 16 establishes communication with the described stack (3) for withdrawing a portion of the products of combustion for admixture with air passing 15. For admitting fuel I provide valved inlet 17 on the pressure side of fan or pump 18. As shown, element 18 draws gas or other fuel material through valved inlet 19. A suitable amount of hot products of combustion can be used to dilute the fuel by the use of valved conduit 20 leading to the stack (3). The gas introduced by the pump passes through conduit 21 and vertical uptakes 22 to chambers 23 in communication with the space between 5 and 6.

In use a flame jet is produced within the shaft chamber by ignition of gas from 19 and air from 15, the combustion being moderated and regulated by the mixture of products of combustion with either or both by appropriate regulation of the valves in 16 and 20. The air entering under the pressure of 14 passes through 6 and entrains the fuel to form a flame plume. With the chamber hot and the combustion going on in the desired manner, a regulated feed of solid materials is allowed to enter 7 from the hopper and is carried forward by the passing air and is projected upwardly in the described flame jet. In so doing every particle is isolated from the others and is individually exposed to the heat and such oxidation as may be desired. While the treatment is of material en masse, nevertheless the individual particles are individually treated. After passing upward with the flaming gases for a time depending upon the force or speed of the jet, the proportion of solids to gases and other conditions, the particles pass out of the axial jet and fall downward at the sides of the chamber, this downward fall being, of course, assisted by the convectional movements of the gases. The cross section of the shaft being ample, the motion of the axially passing jet of swiftly moving gases quickly slows down, and this downward fall is not interfered with while there is very little loss in dust going away with the waste gases through 3.

Heated and treated solid materials accumulating at the bottom of the shaft pass downward through conduits 24 placed between the stated uptakes 22 and accumulate in a bottom chamber 25 whence they are removed continuously or from time to time, as the case may be, by screw conveyor 26. The accumulation of hot solids in this bottom chamber acts as a preheating agent for the materials entering the chamber through conduit 7.

It is, of course, possible to reverse the functions of the fuel inlet and the air inlet, introducing the fuel through 12 and the air through 17; but there is no particular advantage in so doing. In lieu of using products of combustion as a moderating and regulating endothermic constituent of the blast, steam may be so used; or the air may be moistened. The materials to be treated may be dried or partially dried before introduction into the apparatus. Where they contain moisture, this moisture has an endothermic effect similar to that of products of combustion and this may in some cases suffice without use of products of combustion. But ordinarily I regard the use of at least some products of combustion as advantageous as their regulatory effect is better than that of steam or water vapor.

The described apparatus may, of course, be used in activating or heightening the activity of fresh materials as well as in revivifying those which have been used.

What I claim is:—

1. Apparatus for revivifying pulverulent purifying materials comprising a shaft chamber having a waste gas outlet at its top, means for projecting in said chamber a centered stream of hot gaseous material, centered means for delivering particles of said material into said stream and lateral collecting means surrounding the projecting means, for falling particles.

2. Apparatus for revivifying pulverulent purifying materials comprising a furnace shaft chamber having a waste gas outlet at its top, means for commingling combustion-supporting gas and gaseous fuel under pressure to form a centered vertical jet in said chamber, means for introducing particles of said material into said jet at its base and surrounding means for collecting falling material.

3. Apparatus for revivifying pulverulent purifying materials comprising a shaft chamber having a waste gas outlet at its top, means for producing streams of fuel and combustion-supporting gas under pressure to form a centered vertical jet in said chamber, means for introducing particles of said material into one of said streams, surrounding collecting means for falling material and means for delivering diluting gas to at least one of said streams.

4. Apparatus for treating material of the character described comprising a furnace chamber, means for producing streams of fuel and combustion-supporting gas under pressure to form a centered vertical jet in said chamber, means for introducing particles of said material into one of said streams and means for delivering waste gas from said chamber to at least one of said streams.

5. A fountain furnace for revivifying and activating pulverulent purifying materials comprising a vertically extending furnace chamber having a waste gas outlet at its top, means for introducing into said chamber a centered vertically directed gaseous jet at a high temperature, means for introducing particles of said material into said jet near its base, and means surrounding the jet means for collecting falling material.

6. A fountain furnace for revivifying and activating pulverulent purifying materials comprising a vertically extending furnace chamber having a waste gas outlet at its top, means for introducing into said chamber a centered vertically directed gaseous jet at a high temperature, means for introducing particles of said material into said jet near its base, means surrounding the jet means for collecting falling material, and means for introducing a diluent gas into said jet for modifying the temperature thereof.

7. In apparatus for revivifying pulverulent purifying materials, a vertical furnace chamber of substantial height and width provided with a waste gas outlet at or near its top, a centrally disposed upwardly presented jet nozzle at or near its base, means for supplying air under pressure thereto, means for admixing such material with such air, means for supplying fuel to the jet thereby formed and means for collecting laterally falling materials at the base of the chamber.

In testimony whereof, I have hereunto affixed my signature.

FRED W. MANNING.